United States Patent [19]
Dunford

[11] Patent Number: 5,167,418
[45] Date of Patent: Dec. 1, 1992

[54] GRIT PROTECTOR

[76] Inventor: Joseph R. Dunford, P.O. Box 538, Waverley, Nova Scotia, B0N 2S0, Canada

[21] Appl. No.: 680,527

[22] Filed: Apr. 4, 1991

[51] Int. Cl.⁵ ............................................. F16J 15/00
[52] U.S. Cl. ...................................... 277/24; 277/201; 277/23; 277/25
[58] Field of Search ................. 277/24, 201, 23, 25, 277/70, 215, 237 A, DIG. 4; 315/110, 111, 112, 115

[56] References Cited

U.S. PATENT DOCUMENTS

| | | | |
|---|---|---|---|
| 2,769,390 | 11/1956 | Heimbuch | 415/111 |
| 2,834,618 | 5/1953 | Wiltse | |
| 2,874,982 | 2/1959 | Winther | |
| 3,070,028 | 12/1962 | Loy et al. | 415/111 |
| 4,185,838 | 1/1980 | Danner | 277/58 |
| 4,335,886 | 6/1982 | Frey et al. | 277/25 |
| 4,484,754 | 11/1984 | Ballard | 277/24 X |
| 4,576,383 | 3/1986 | Ballard | 277/24 X |
| 4,872,690 | 10/1989 | Dunford | 277/24 |

FOREIGN PATENT DOCUMENTS

212879 1/1924 United Kingdom .

*Primary Examiner*—William A. Cuchlinski, Jr.
*Assistant Examiner*—James K. Folker
*Attorney, Agent, or Firm*—Jones, Tullar & Cooper

[57] ABSTRACT

This invention relates to a grit protector for rotating fluid processing equipment. The protector is placed in or adjacent the seal cavity of the equipment and includes an axial portion and a generally radial flange which, when the device is within the seal cavity, has an inner diameter slightly greater than the shaft. The flange has at least one low flow vent therein, the vent being defined by a radial slit in the flange, an arcuate slit along the periphery of the flange adjacent the axial portion, and a bend line extending from the radial inner end of the radial slit to the extended end of the arcuate slit. The material of the slit as bounded by the slits and the bend line is curved inwardly and radially outwardly to define a vent entrance adjacent the first slit to define a flap. The flap has a short generally straight portion extending from the vent entrance and then curves smoothly towards the flange. With the invention grit is efficiently removed from the seal cavity with little possibility of damage to the shaft, the seals, the housing, or the rotating member.

17 Claims, 6 Drawing Sheets

GRIT PROTECTOR

This invention relates to a device which is useful in protecting the seal cavity of rotating fluid equipment from the deleterious effects of grit and other contaminants within the fluid.

BACKGROUND OF THE INVENTION

Rotary fluid equipment, such as centrifugal pumps, usually include a rotary operative member such as an impeller which is driven by a prime mover such as an electrical motor. A rotary shaft connects the prime mover to the operative member. Typically the operative member is contained within its own housing, having an inlet and an outlet for the fluid being moved, with the shaft passing through the back of the housing. The shaft may be supported by bearings and usually there will be seals engaging the shaft to prevent fluid which enters the housing from reaching the prime mover. The seals, shaft and seal housing define a seal cavity which opens towards the housing containing the operative member.

During operation of the rotary fluid equipment particulate contaminant material carried into the equipment by the moving fluid, or eroded from the adjacent surfaces of the housing or the impeller, can enter the seal cavity and damage the shaft and/or the seals unless some type of protector is arranged at the entrance to the seal cavity.

There have of course been attempts in the past to protect the seal cavity. Most such attempts have involved the attachment of a plate or other member to the shaft at the entrance to the seal cavity to aid in eliminating air (U.S. Pat. No. 3,070,028) or to prevent fluid from entering the seal cavity when the equipment comes to a halt (U.K. Patent 212,879). Other attempts involve labyrinth type seals which utilize elements on the shaft and the shaft housing which are interdigitated to increase the difficulty for contaminants to enter the seal cavity (U.S. Pat. Nos. 2,834,618; 2,874,982; 4,185,838; and 4,335,886).

U.S. Pat. No. 4,872,690, assigned to the assignee of the present application, describes a device which is successful in reducing contaminant concentration in the seal cavity. It does, however, require intricate machining to install and it requires a high velocity source, such as a rotating impeller, very close thereto for successful operation. Operation of the device results in a marked reduction in the seal cavity pressure. The reduced pressure draws a very high flow of contaminated fluid from behind the impeller into the device. In drawing a high flow into the device, high wear occurs on the shaft and components of the device. Additionally, the reduced seal cavity pressure and the very high exchange rate of fluid into the device and the seal cavity prohibits its use in applications wherein the pumped fluid is at or even near its vapour point. The high fluid exchange and pressure reduction can result in flashing of the product to vapour at the seal faces, thus destroying the seal. The requirement for a high velocity source prohibits use of the '690 invention in certain low speed pump types, including progressive cavity pumps, screw pumps and gear pumps.

SUMMARY OF THE INVENTION

The present invention provides a venting arrangement which controls and reduces the exchange of fluid into and out of the area of the seal, while effectively ejecting contaminant particulate material from the area of the seal. Therefore, axial flows are much lower than with the previous devices. This in turn reduces the amount of grit drawn into the seal area by the returning flow between the device and the shaft. The controlled flow design of the vent results in substantially less pressure reduction in the seal cavity, thus having the ability to be used in applications where the fluid is near vapour point.

Generally speaking, and in one form, the present invention provides a seal cavity protector for use with rotary equipment, a seal cavity of which is defined by a rotary shaft, a shaft housing and seal means engaging the shaft, the protector comprising an annular axial portion adapted for a tight fit in the housing, a first annular generally radial flange connected to the axial portion, the flange having an inner diameter greater than the diameter of the shaft, and at least one vent passage in the flange between the flange and the axial portion for passing fluid and contaminants out of the cavity, the vent passage comprising a flap defined by a first slit extending radially inwardly from the axial portion, a second slit extending arcuately from the radially outer end of the first slit along the outer periphery of the flange, and a bend line extending normal to the first slit from the radial inner end thereof to the extended end of the second slit, the material of the flap as bounded by the slits and the bend line being curved inwardly and radially outwardly to define a vent entrance adjacent the first slit.

The reduction of axial velocities particularly under the first radial flange results in a marked improvement in radial separation of the grit through centrifugal effects. It has been found that the radial flanges can have greater tolerance with respect to the shaft and can be more compact in the radial dimension. This enables installation in smaller seal cavities and restricted radial spaces.

The basic protector of this invention utilizes one annular portion with one radial flange having one or more vent passages around its outer circumference. The axial portion is press fit into the seal cavity or any machined bore. The flange surrounds the rotating member (shaft, sleeve, impeller axial extension, or the rotating component of the seal). The vent passages in the outer circumference of the flange are designed to extend into the fluid flow on the seal side. Therefore, when the fluid is rotated by the motion of the shaft, impeller and seal, the vent scoops a defined volume of fluid from the seal side to the impeller side. The vents are located at the outer circumference since grit is thrown radially outward by centrifugal action. In this way, grit having specific gravity greater than that of the fluid will be ejected from the area of the seal.

When used in fluids containing larger amounts of grit, the grit rejection is enhanced through the use of two generally radial flanges, each having vent passages of the same design. The number of vent passages in the flanges, however, need not be equal. The space between the flanges acts as a zone where the grit is concentrated for easier ejection by the first vents. Since the amount of flow drawn into the device from the impeller side needs to be minimized, and the collection of grit from the seal area needs to be maximized, the number of vent passages on the impeller side will normally be less than the number on the seal side.

In applications where the volume of the seal cavity is large, a second generally radial flange can be utilized having vents arranged to induce a high flow between the two radial flanges, and the seal cavity. This results in a more rapid removal of grit from the seal cavity, while still minimizing the ingress of grit from behind the impeller. In cases where the specific gravity of the grit is very near to that of the fluid, this arrangement may result in the high flow carrying some amounts of grit back into the seal cavity as it recirculates. In these cases, a three-flange device may have to be used. The first two flanges in such an arrangement have low flow vents and form a first stage of grit rejection, while the third flange has high flow vents which act to rapidly remove grit from the seal cavity.

The device of the present invention can be placed within an unmodified seal cavity if desired. This results in a defined clean zone of fluid around the seal, and a dirty zone at the inner end of the cavity. To prevent recirculation of grit from the dirty zone to the clean zone, a filter screen can be introduced to the impeller side of the vented flange. This filter screen can be held in position by a second (or third) flange, and will entrap the grit. This version would be very effective in applications where a pump was operated with no flush connections (e.g. dead ended) as is typical in cooling tower pumps, source water pumps et cetera. Since the seal cavity is operated dead ended, the device only has to entrap grit introduced during initial flooding and very small quantities during operation.

The device of U.S. Pat. No. 4,872,690 used a vent system which created a very high flow of fluid (and grit) from behind the impeller, into the device. The present invention utilizes a vent configuration which diverts a set quantity of fluid as it rotates within the device. Therefore, a lower flow will pass from the device towards the impeller and back into the device. This controlled lower flow will carry the rejected particulate material from the device, without greatly affecting the seal cavity pressure, and will gently reduce the amount of grit drawn back into the device. Since the configuration of the device presents a generally flat surface, press fitting of the device into the pump housing is easily carried out. As well, the device of the present invention is not restricted to use with certain types of pumps as is the invention of the '690 Patent. The present invention can be used with all types of pumps.

DESCRIPTION OF THE PREFERRED EMBODIMENT

Figure 1:
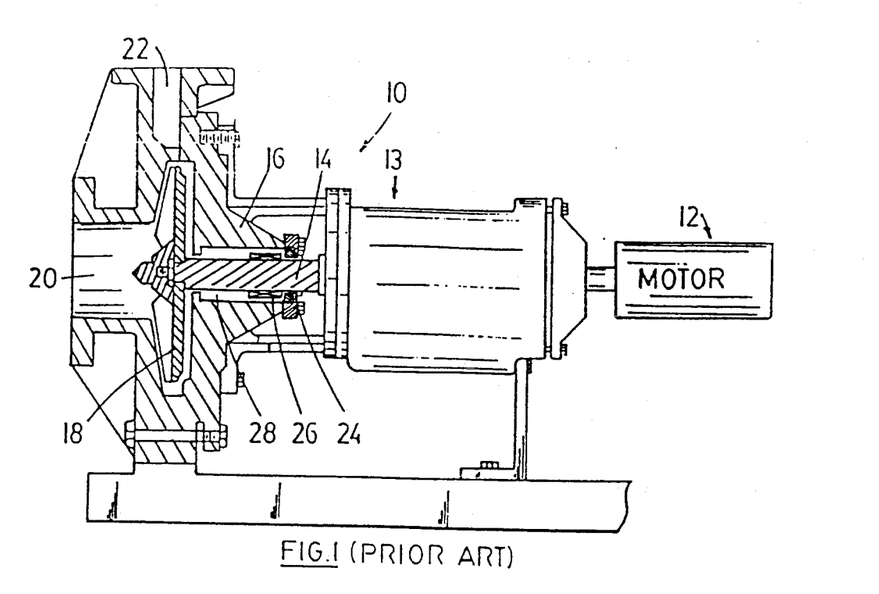
FIG. 1 shows, in partial cross section, an elevational view of typical rotary fluid equipment, in which this invention may be used.

FIG. 1 illustrates a typical environment for the device of the present invention. In this case the rotary equipment comprises a centrifugal pump 10 which is operated by an electric motor 12. The motor drives a rotary shaft 14 connected within a bearing housing 13. The shaft is connected to a centrifugal impeller 18 which, as it rotates, draws fluid in through inlet 20 and pumps the fluid out through radial outlet 22. The shaft 14 is typically supported by bearings within the bearing housing 13. As seen in FIG. 1 a seal cavity 28 is defined in general by the shaft 14, the housing 16, the seals 26, and the gland 24.

Figure 2:
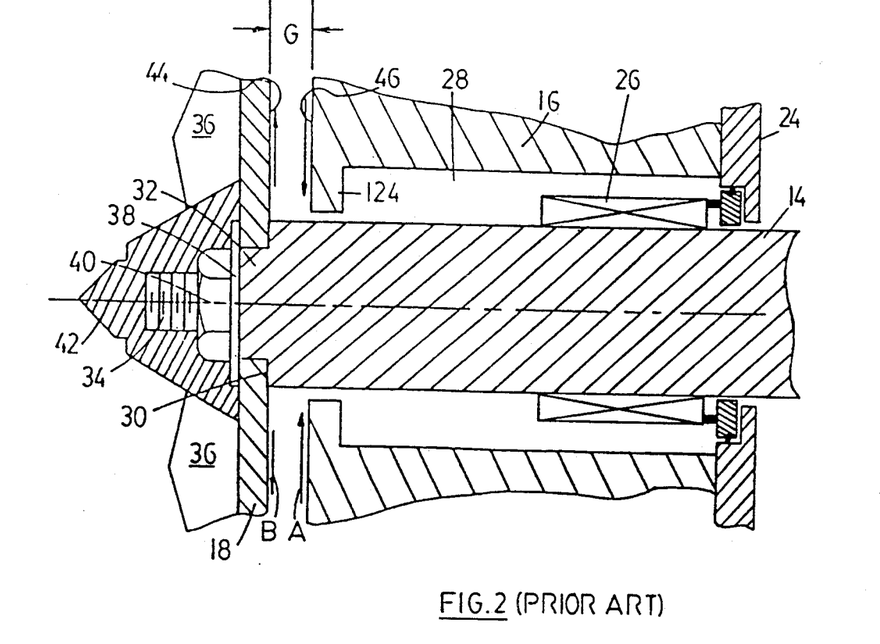
FIG. 2 shows in cross section an enlarged view of a typical seal cavity of a pump utilizing a mechanical seal.

FIG. 2 illustrates a somewhat enlarged view of the area where the shaft 14 connects to the impeller 18. It is seen therein that the shaft 14 has a shoulder 30 with a smaller diameter portion 32 extending therefrom. A threaded portion 34 projects from the portion 32. The impeller 18, with vanes 36, fits over the portion 32 and abuts the shoulder 30. A washer 38 and nut 40 are drawn tight against the impeller 18 to clamp it to the shaft 14 and a nose piece 42 fits over the nut, washer and exposed end of the threaded portion 34. With the impeller in place there is a thin gap G between the inner face 44 of the impeller and the outer face 46 of the housing.

Seal members 26 are typically held in position on the shaft by a gland 24 and by set screws (not shown).

The flow pattern of the fluid in a typical centrifugal pump sets up countercurrents which flow spirally inwardly within the gap G, as shown generally by the arrows A. Such countercurrents carry contaminant material which, if it enter the seal cavity, can damage the seals 26 and the rotary shaft 14.

It should perhaps be pointed out that the spirally inward flow A will generally be adjacent the surface 46. Since there are dynamic forces at work there will, of course, be a spirally outward flow B as well, such as along surface 44, taking fluid away from the shaft area.

Figure 3:
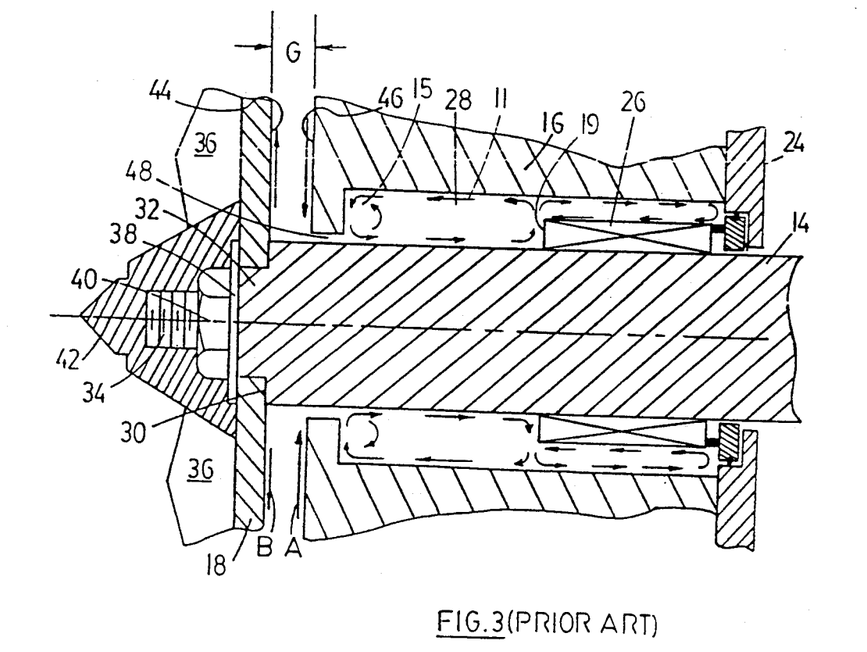
FIG. 3 is a view similar to FIG. 2 showing fluid flow patterns within the seal cavity.

With reference to FIG. 3, there will be fluid flow into the cavity 28 through the gap or opening 48 in the front face of the housing 16 adjacent the shaft 14. Such flow will include grit or particulate contaminant material which was moving spirally inwardly along the housing face 46. Within the cavity there will be flow of containment-carry fluid generally along the path 11 shown by the arrows, bearing in mind that there is also a rotational component to the flow caused by shear between the fluid and the rotating shaft and seal. The front face 19 of the seal 26 during rotation imparts a radially outward movement to the fluid, a portion thereof flowing towards the front of the cavity and a portion flowing towards the back, between the seal and the housing. There will be a concentration of contaminants in the forward area 15 of the cavity 28, adjacent the radially outer junction between the housing cavity wall and the lip of the housing at the forward end, making for an ideal location in which to position the device of the present invention.

The seal grit protector can take one of several configurations depending on the size of the seal cavity, the specific gravity of the particulate material, the configuration of the pump or equipment, and the amount of particulate material in the pumpage. The preferred embodiment will perform multiple functions and it is that embodiment which is shown in FIGS. 4 to 18.

Figures 4, 5:
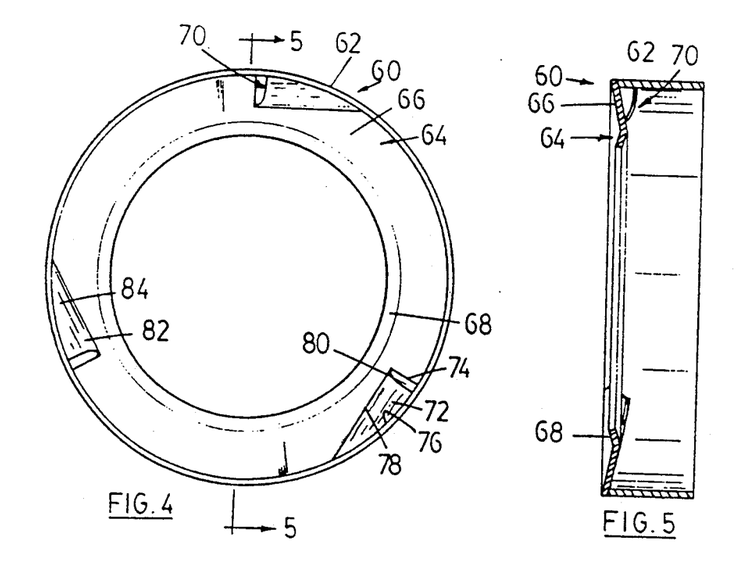
FIG. 4 is an end view of a grit protector in accordance with the present invention.
FIG. 5 is a cross section of the grit protector taken on the line 5—5 of FIG. 4.
Figure 6:
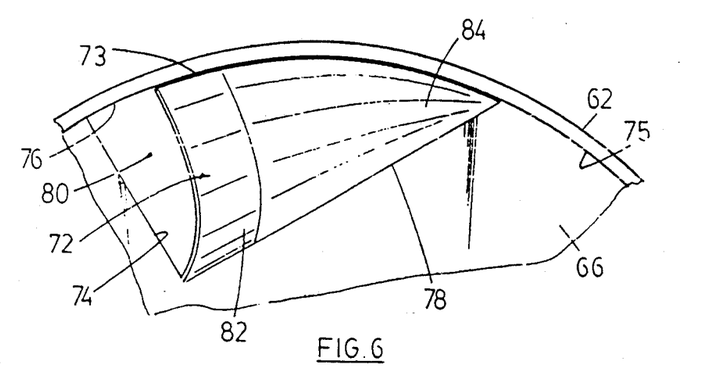
FIG. 6 is an enlarged perspective view of a vent passage as used in the grit protector of this invention.
Figure 7:
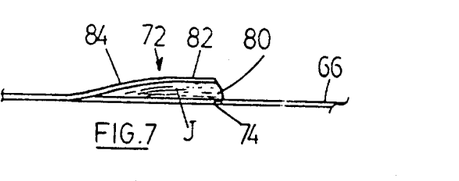
FIG. 7 is a side view of a vent passage.

The seal grit protector of this invention is depicted by the reference number 60, in its basic form, and is found in FIGS. 4, 5 and 6. Therein, an annular axial section 62 is seen, which section is adapted preferably, for a tight fit in the housing 16. A first annular, generally radial, flange 64 is connected to the forward edge of the annular axial section 62 and has an inner diameter slightly greater than that of the shaft 14. Although the flange 64 could be at an angle of 90 degrees with the section 62 it is preferred that the radially outer portion 66, as shown, be angled rearwardly of the device by a small angle for reasons to be discussed hereinbelow. Preferably, as well, the flange 64 includes a radially inner portion 68 which is angled forwardly but which could also be directed radially inwardly or even rearwardly relative to a transverse plane through the protector at the inner edge of the outer portion 66.

As seen particularly in FIGS. 4 and 6 the protector of this invention includes at least one vent passage 70 between the flange 64 and the axial section 62 for passing fluids and contaminant material out of the cavity 28. The vent passage 70 comprises a flap 72 defined by first and second slits 74, 76 through the outer flange portion 66 and by a bend line 78, the material of the flap being curved axially inwardly and radially outwardly to define a vent passage entrance 80 adjacent the first slit 74. The flap 72 has a short straight portion 82 extending away from the vent entrance 80 and a portion 84 that curves smoothly towards the flange portion 66.

The first slit 74 extends radially inwardly from the axial section 62 and the second slit 76 extends arcuately from the radially outer end of the first slit along the outer periphery of the flange outer portion 66. The bend line 78 extends normal to the first slit 74 from the radial inner end thereof to the extended end of the second slit 76.

Because the outer portion 66 of the flange 64 is angled rearwardly of the protector 60 the free edge 73 of the flap 72 defined by the arcuate second slit 76 will be closely adjacent, and will preferably abut, the inner surface 75 of the axial section 62. If the outer portion 66 of the flange 64 is generally normal to the axial section 62 there will be a slight gap between the arcuate edge of the flap 72 and the inner surface 75 of the axial section 62 which could reduce, possibly, the effectiveness of the vent passage 70.

As shown in FIG. 4 a plurality of the vent passages 70 is provided, circumferentially spaced apart around the protector 60. Three or more vent passages provide for optimum effectiveness although the invention is still operable with two vent passages or even a single vent passage. In fact there may be specific circumstances in which a single-vent protector is preferred over a multi-vent protector.

Figure 8:
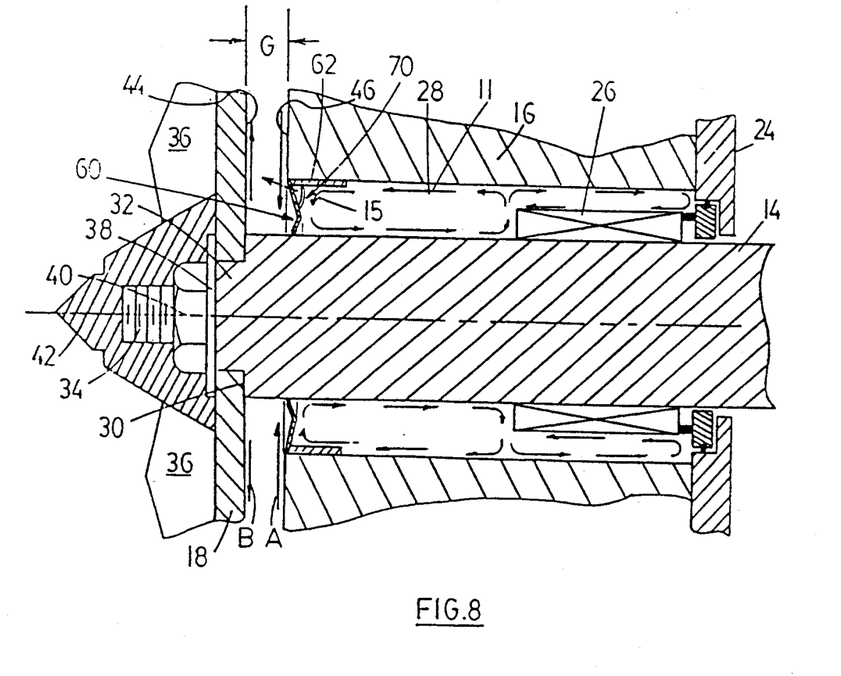
FIG. 8 is a view similar to FIG. 3 showing a grip protector of the invention in place.

FIG. 8 shows a "standard" mounting arrangement for the present invention, the protector 60 being positioned at the entrance to the seal cavity 28, the axial section 62 having a press fit in the housing 16. In this arrangement the vent passage 70 as defined by the flap 72 scoops the rotating fluid from the zone 15 within the seal cavity and directs it outwardly towards the impeller 18. Contaminant material within the flow 11 at the zone 15 is ejected to behind the impeller whence it is moved radially outward along the surface 44 with the spiral flow indicated by the arrow B.

In comparison to the seal cavity protector of the '690 Patent there will be greatly reduced axial flow through the annular gap between the shaft 14 and the adjacent edge of the flange portion 68. This results in less grit being drawn into the seal cavity 28.

Returning to FIGS. 6 and 7 a more detailed inspection of the vent passage 70 and the flap 72 shows the straight and curved portions 82 and 84 of the flap 72. The straight portion 82 helps to ensure that the momentum of the rotating fluid is utilized at the point J to deflect the external flow in the gap G away from the flange 64. Thus, the fluid exiting via the vent passage 70 will not be subject to excessive back pressure or the creation of eddies, either of which could deleteriously affect the efficiency of the protector 60.

The enlarged view of FIG. 6 shows the elements of the flap 72, including the slits 74, 76 and the normal bend line 78. In a typical protector the vent opening 80 could be in the order of 3 mm wide and 5 mm long.

Figure 9:
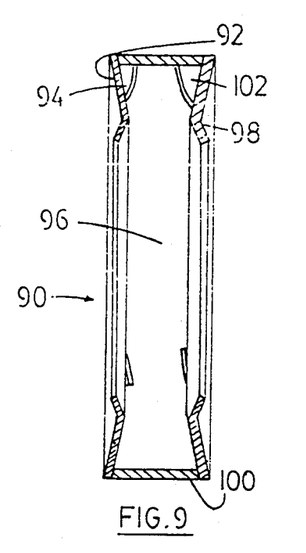
FIG. 9 is cross sectional view similar to FIG. 5 showing a first variant of the invention.
Figure 10:
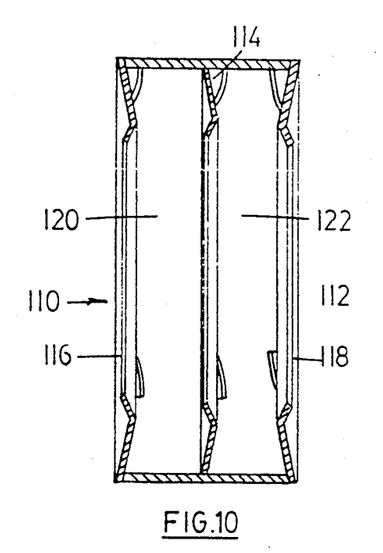
FIG. 10 is a cross sectional view similar to FIG. 5 showing a second variant of the invention.

FIGS. 9 and 19 illustrate two multi-flange embodiments of the protector according to this invention, FIG. 9 showing a two-flange version and FIG. 10 showing a three-flange version.

The protector 90 of FIG. 9 is used for large volume flow situations where additional flow is required to quickly remove the contaminant material. The flange 92 is essentially the same as flange 64 of the basic protector 60, having a plurality of circumferentially spaced vent passages 94 for scooping fluid and contaminant material from the inter-flange zone 96. The second flange 98 at the opposite end of the axial section 100 has its vent passages 102 with the zone 96, those passages acting as suction vents to draw fluid from the cavity 28. The zone 96 acts as a concentrator so that the low flow vents of the flange 92 can easily remove the contaminant material. Because of this design, flow into the cavity 28 from outside will be at a low rate and less contaminant material will be drawn into the cavity 28.

In the FIG. 10 embodiment the protector 110 is longer (axially) than the FIG. 9 protector so that a third flange 112 having scoop vent passages 114 can be positioned between first and second flanges 116, 118 which are essentially the same as flanges 92, 98 respectively. The zone 120 between flanges 116 and 112 acts as a zone for rejection of low specific gravity contaminant material. The amount of contaminant material in the zone 122 between flanges 112 and 118 is greatly reduced and thus the effect of the high flow exiting that zone to the cavity 28 is not as critical as it would otherwise be. A small volume of contaminating material is carried by that flow into the seal cavity 28. Because of the vent passage design, essentially a low flow design, the axial flow between the inner edge of the flange 64, 92 or 116 and the shaft 14 is greatly reduced in comparison to that experienced with the device of U.S. Pat. No. 4,872,690 and consequently less contaminant material is drawn into the seal cavity from adjacent the impeller 18.

Figure 11:
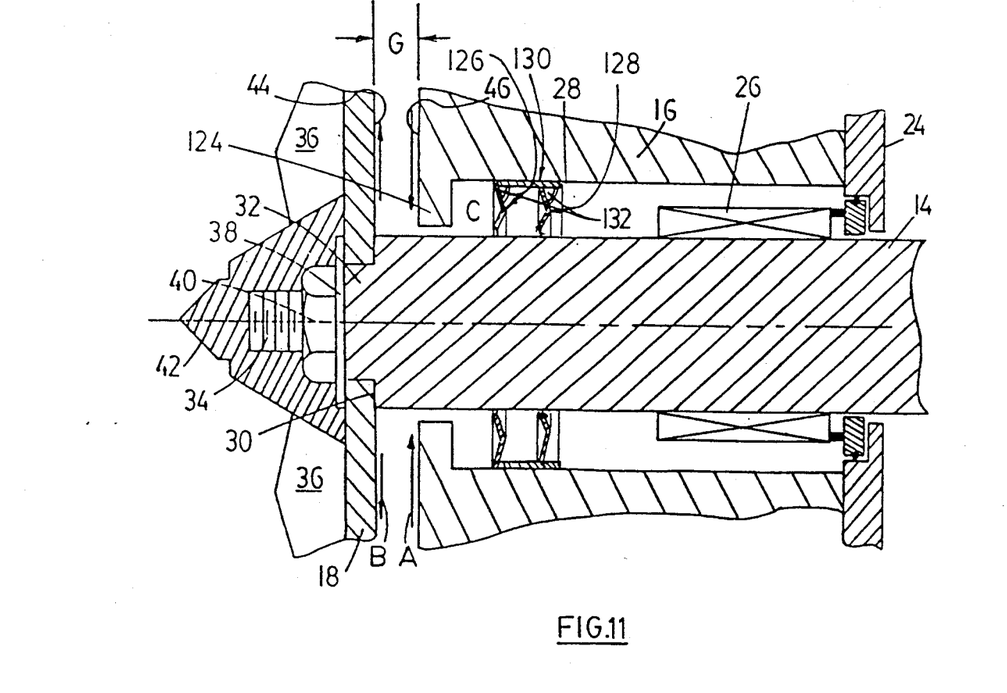
FIG. 11 is a view similar to FIG. 2 showing another variant of the invention in place.

In view of the fact that high flow velocities are neither required nor produced with the present invention it is possible to position the protector of this invention farther away from the impeller, deeper within the cavity (FIG. 11). It also does not need the inside diameter vents described in the '690 Patent and hence it can be more radially compact than the device of that patent. This means fewer modifications to the seal cavity or the housing 16. Although the configuration of FIG. 11 may not be quite as efficient as the configuration of FIG. 8 where the protector replaces the lip 124 at the entrance to the cavity 28, it will result in increased seal life and reduces the cost of installation. There will be some recirculation of the contaminant material if there is a build-up thereof in the zone C between the device and the lip 124 but this can be reduced if both flanges 126, 128 on the protector 130 are provided with low flow (scoop) vent passages 132.

FIGS. 8 and 11 illustrate the two preferred locations for the grit protector of this invention, whether the version used be the basic one of FIG. 4 or a variant as shown in FIG. 9, 10 or 11. Hereinafter will be described several more variants and modifications, it being understood that each could be positioned either as shown in FIG. 8, at the entrance to the seal cavity 28 or, as shown in FIG. 11, within the seal cavity 28 behind the lip 124.

Figure 12:
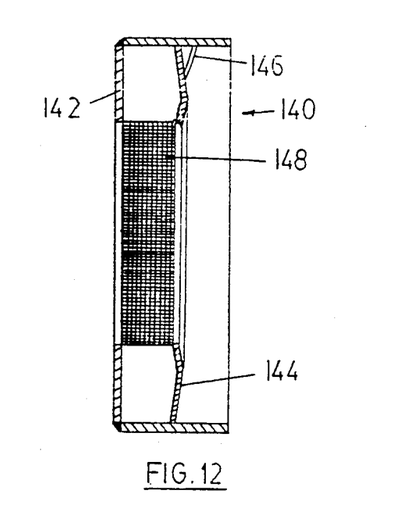
FIG. 12 shows a cross sectional view of yet another variant of the invention.

FIG. 12 shows a variant 140 of the basic protector wherein there is a plain radial flange 142 positioned in advance of the angled flange 144, the latter carrying the low velocity scoop vents 146. In order to avoid the recirculation of grit when the protector 140 is positioned behind the lip 124 (whether abutting the lip or spaced therefrom) an annular fine mesh filter screen 148 spans the distance between the flanges 142, 144 to trap and hold the grip, while allowing fluid to pass therethrough. The screen concept could be a modification to the protectors shown in FIGS. 9, 10 and 11 as well so as to further reduce contaminant circulation. The protector could be removed from the seal cavity at regular intervals for cleaning, either by removing and replacing the filter screen or by backwashing.

Figure 13:
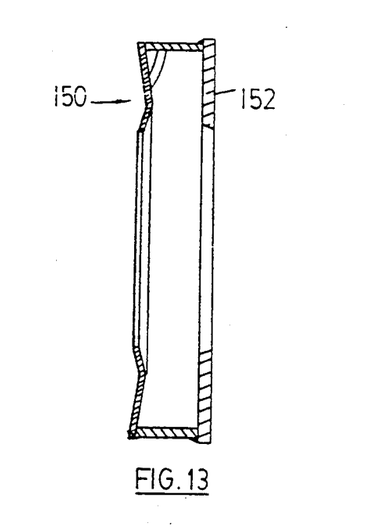
FIG. 13 shows a cross sectional view of still another variant of the invention.

FIG. 13 shows a variant of the basic grit protector 60. In this instance an annular plate 152 is welded or otherwise secured to the back of the protector 150. The plate acts as a backing member and reinforces the protector when it is used with packing that essentially fills the seal cavity (see for example FIG. 14). In the situations envisioned for this variant there will be no requirement for recirculation and hence the plate need not have any vent passages therethrough.

Figure 14:
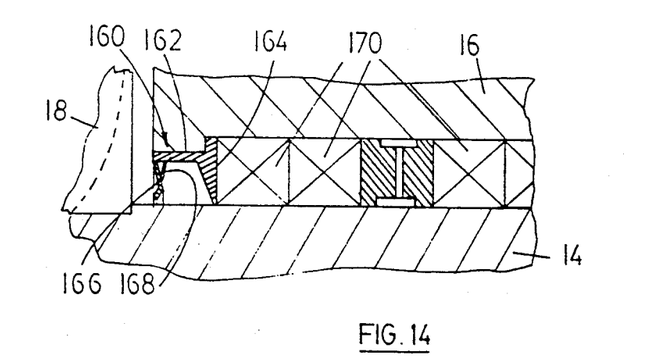
FIGS. 14 and 15 show similar views wherein another variant of the invention is used with different seal configurations.

FIG. 14 shows another version of the variant of FIG. 13, this figure also showing the packing in place. The protector 160 of FIG. 14 has the axial portion 162 and the annular plate 164 formed as a single unitary member, with the angled flange 166 carrying the vent passages 168 secured to the axial portion 162 as by welding. Packing rings 170 are shown in abutment with the annular plate 164.

Figure 15:
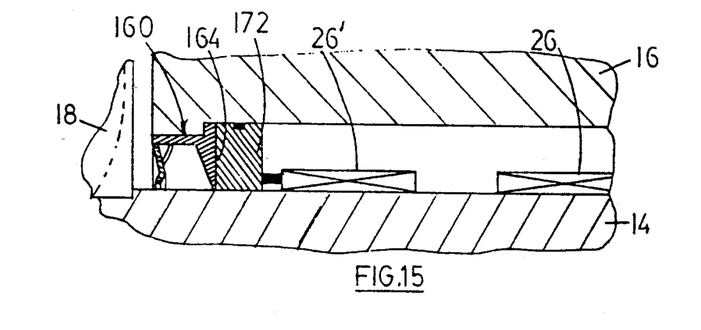

In FIG. 15 the protector 160 is shown in use with double rotary seals 26, 26', the annular plate 164 abutting a stationary inside seal 172 that is sealed with respect to the housing 16 and the adjacent rotary seal 26'.

Figure 16:
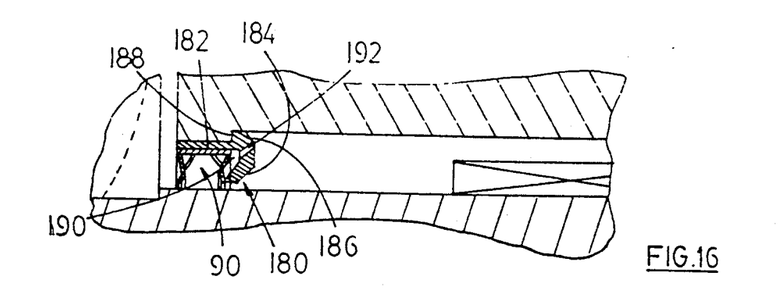
FIG. 16 shows another variant of the invention used to replace a removable throat bushing.

In FIG. 16 a protector 90 as shown in FIG. 9 is illustrated in conjunction with an annular adapter 180 so that the two units together can replace a removable throat bushing. The adapter 180 has an axial portion 182 and a radial portion 184 defining a recess into which the protector 90 will fit. An outer radial flange 186 abuts against the inner shoulder 188 of the housing for positive location. A circumferential recess 190 and a plurality of angled bores 192 allow contaminant carrying fluid to flow into the protector so that grit can be removed as previously described.

Figure 17:
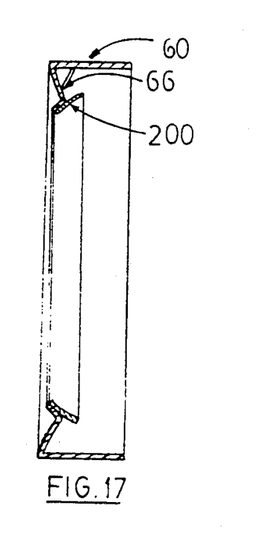
FIGS. 17 and 17a show a modification in the form of a flow director which can be added to any of the disclosed grit protectors.
Figure 17A:
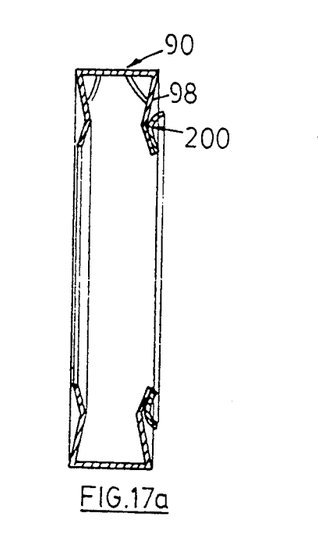

FIGS. 17 and 17a show two related variants of the basic protector 60 and the variant 90. In each case an annular arcuate flow director ring 200 has been attached to the cavity side of the protector adjacent the radially inner end of the flange 66 or 98. The ring 200 tends to accumulate or trap grit in front of the vent and speeds up grip removal form the cavity and reduces the vent flow requirements.

Figure 18:
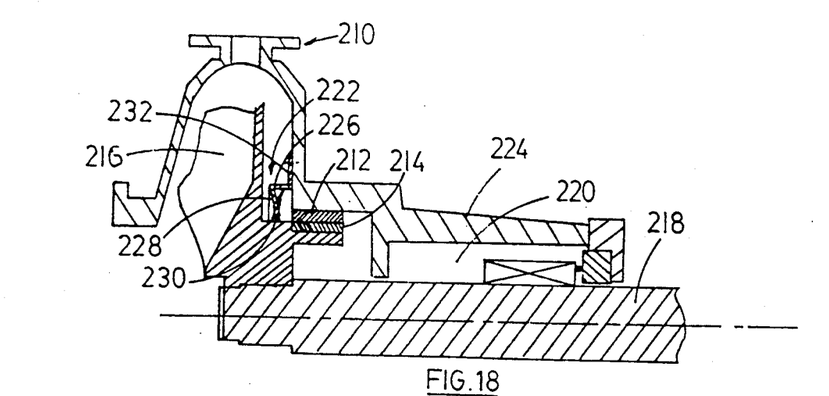
FIG. 18 shows another form of the invention mounted externally of the seal cavity.

FIG. 18 shows another variant wherein the grit protector is positioned outside the seal cavity. A typical refinery pump 210 uses stationary and rotating wear rings 212, 214 at the back of the impeller 216. Many times such rings are mounted so close to the shaft 218 that it is not possible to locate a grit protector within the seal cavity 220. In such instances the grit protector 222 can be mounted outside the wear rings, directly to the housing 224. The protector 222 includes an axial portion 226, an angled flange 228, one or more scoop vent passages 230 as previously described, and an annular outer mounting flange 232 which can be screwed or bolted to the housing 224. The grit protector 222 will work in the same manner as those previously described, rejecting grit or contaminants that appear in the vicinity of the wear rings 212, 214.

The foregoing has described the grit protector of the present invention in basic and modified forms and has indicated a number of applications therefor. Undoubtedly a skilled person could create many more variations or modifications and could use the invention in a multitude of situations not illustrated herein, all without departing from the spirit of the invention. Accordingly the protection to be afforded this invention is to be determined from the scope of the claims appended hereto.

The embodiments of the invention in which an exclusive property or privilege is claimed are defined as follows:

1. A seal cavity protector for use with rotary fluid equipment, a seal cavity of which is defined by a rotary shaft having an axis, a shaft housing surrounding at least a portion of the shaft and seal means engaging the shaft, said protector comprising an annular axial portion adapted for a tight fit in said housing, a first annular generally radial flange connected to said axial portion, said flange having an inner diameter greater than the diameter of said shaft, and at least one vent passage in said radial flange between said flange and said axial portion for passing fluid and contaminants out of said cavity, said vent passage comprising a flap defined by a first slit in said flange extending radially inwardly from said axial portion, a second slit in said flange extending arcuately from the radially outer end of said first slit along the outer periphery of said flange, and a bend line in said flange extending normal to said first slit from the radial inner end thereof to the extended end of said second slit, the material of said flap as bounded by said slits and said bend line being curved axially inwardly toward said seal means and radially outwardly of said protector to define a vent entrance within said protector adjacent said first slit.

2. The protector of claim 1 wherein, adjacent said axial portion, said flange includes a portion directed axially inwardly of said protector whereby a flap edge produced by said second slit abuts said axial portion.

3. The protector of claim 2 wherein a portion of said flange radially inwards of said axially inwardly directed portion is directed radially inwardly relative to said protector.

4. The protector of claim 2 wherein a portion of said flange radially inwards of said axially inwardly directed portion is directed axially outwardly relative to said protector.

5. The protector of claim 2 wherein a portion of said flange radially inwards of said axially inwardly directed portion is also directed axially inwardly relative to said protector.

6. The protector of claim 3 including an annular flow director member secured to said radially inwards portion of said flange, said director member curving radially outwardly and axially inwardly relative to said protector.

7. The protector of claim 2 including a plurality of said vent passages circumferentially spaced apart in said flange.

8. The protector of claim 7 including a second annular generally radial flange connected to said axial portion axially inwardly of said first flange, said second flange including a plurality of said vent passages therein opening between said first and second flanges.

9. The protector of claim 8 including an annular flow director member secured to said second flange, said director member curving radially outwardly and axially inwardly relative to the protector.

10. The protector of claim 8 including a third annular generally radial flange connected to said axial portion intermediate said first and second flanges, said third flange including a plurality of said vent passages therein opening between said second and third flanges.

11. The protector of claim 7 including an additional annular generally radial flange connected to said annular portion axially inwardly of said first flange, said additional flange including a plurality of said vent passages therein opening axially inwardly of said additional flange.

12. The protector of claim 7 including an additional generally radial plate connected to an axially inward edge of said axial portion for abutment against annular packing or seal members within said cavity.

13. The protector of claim 11 including a further annular generally radial flange connected to said axial portion axially outwardly of said first flange, and an annular filter screen extending axially between the radially innermost edges of said further and first flanges.

14. The protector of claim 12 wherein said additional flange and said axial portion are formed as a unitary member.

15. The protector of claim 13 including a plurality of angled bores extending through said additional flange.

16. A seal cavity protector for use with rotary fluid equipment, a seal cavity of which is defined by a rotary shaft having an axis, a shaft housing surrounding at least a portion of the shaft and seal means engaging the shaft, said protector comprising an annular axial portion adapted for a tight fit in said housing, a first annular generally radial flange connected to said axial portion, said flange having an inner diameter greater than the diameter of said shaft, and at least one vent passage in said radial flange between said flange and said axial portion for passing fluid and contaminants out of said cavity, said vent passage comprising a flat defined by a first slip in said flange extending radially inwardly from said axial portion, a second slit in said flange extending arcuately from the radially outer end of said first slit along the outer periphery of said flange, and a bend line in said flange extending normal to said first slit from the radial inner end thereof to the extended end of said second slit, the material of said flap as bounded by said slits and said bend line being curved axially inwardly toward said seal means and radially outwardly of said protector to define a vent entrance within said protector adjacent said first slit, said flap having a short generally straight portion extending from the vent entrance and a portion curving smoothly from the straight portion towards said flange.

17. The protector of claim 16 including a further annular generally radial flange connected to said axial portion axially outwardly of said first flange, and an annular filter screen extending axially between the radially innermost edges of said further and first flanges.

* * * * *

UNITED STATES PATENT AND TRADEMARK OFFICE
CERTIFICATE OF CORRECTION

PATENT NO. : 5,167,418
DATED : Dec. 1, 1992
INVENTOR(S) : Dunford

It is certified that error appears in the above-identified patent and that said Letters Patent is hereby corrected as shown below:

Col. 9, claim 2, line 1, change "1" to --16--
Col. 10, claim 13, line 1, change "11" to --16--
Col. 10, claim 15, line 1, change "13" to --14--
Col. 10, claim 17, line 1, change "16" to --11--

Signed and Sealed this

Sixteenth Day of November, 1993

*Attest:*

BRUCE LEHMAN

*Attesting Officer*  *Commissioner of Patents and Trademarks*